United States Patent
Kawasaka

(10) Patent No.: US 8,106,976 B2
(45) Date of Patent: Jan. 31, 2012

(54) PERIPHERAL LIGHT AMOUNT CORRECTION APPARATUS, PERIPHERAL LIGHT AMOUNT CORRECTION METHOD, ELECTRONIC INFORMATION DEVICE, CONTROL PROGRAM AND READABLE RECORDING MEDIUM

(75) Inventor: Yasuki Kawasaka, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 615 days.

(21) Appl. No.: 12/084,685

(22) PCT Filed: Nov. 6, 2006

(86) PCT No.: PCT/JP2006/322124
§ 371 (c)(1),
(2), (4) Date: Mar. 26, 2009

(87) PCT Pub. No.: WO2007/055179
PCT Pub. Date: May 18, 2007

(65) Prior Publication Data
US 2009/0219419 A1    Sep. 3, 2009

(30) Foreign Application Priority Data
Nov. 9, 2005   (JP) .................................. 2005-325201

(51) Int. Cl.
H04N 9/64   (2006.01)
H04N 5/217   (2011.01)
H04N 5/225   (2006.01)
G06K 9/40   (2006.01)

(52) U.S. Cl. ........ 348/251; 348/241; 348/335; 382/274; 382/275

(58) Field of Classification Search .................. 348/241, 348/251, 335; 358/461; 382/274, 275
See application file for complete search history.

(56) References Cited

FOREIGN PATENT DOCUMENTS

| | | |
|---|---|---|
| JP | 01-186064 | 7/1989 |
| JP | 07-074987 | 3/1995 |
| JP | 2002-010122 | 1/2002 |
| JP | 2002-077722 | 3/2002 |
| JP | 2002-094860 | 3/2002 |
| JP | 2003-110936 | 4/2003 |
| JP | 2003-198880 | 7/2003 |
| JP | 2004-320645 | 11/2004 |
| JP | 2005-150986 | 6/2005 |
| JP | 2005-341033 | 12/2005 |
| WO | WO-2005/043891 | 5/2005 |

OTHER PUBLICATIONS

English-Language Translation—Written Opinion of the International Search Authority (PCT/ISA/237) prepared for PCT/JP2006/322124 (May 5, 2009).*

(Continued)

*Primary Examiner* — David N Spector
(74) *Attorney, Agent, or Firm* — Edwards Wildman Palmer LLP; David G. Conlin; Steven M. Jensen

(57) ABSTRACT

The present invention corrects the insufficient peripheral light amount due to the lens shading and correcting the non-uniformity of light amount at the periphery due to a distortion resulting from a precision of the lens or a poor mounting precision of the lens. A peripheral light amount correction circuit is structured by an image synchronization signal generation circuit, a coordinate conversion circuit and a luminance value correction computing circuit. An integrated value of luminance values is calculated at the coordinate conversion circuit to extract light amount information. Coordinate values to be input to the luminance value correction computing circuit are generated based on an integrated/averaged value of the light amount information. In the luminance value correction computing circuit, peripheral light amount correction functions are converted based on the input coordinate values from the coordinate conversion circuit to perform appropriate correction on the input image.

45 Claims, 10 Drawing Sheets

OTHER PUBLICATIONS

International Search Report, mailed Jan. 30, 2007, in International Application No. PCT/JP2006/322124.

Taiwanese Search Report dated Nov. 10, 2009 issued in Taiwan Patent No. 095141556.

* cited by examiner (a)
When lens and light receiving face are set parallel to each other Can be corrected by conventional technique (b)
When lens and light receiving face are not set parallel to each other Cannot be corrected by conventional technique Luminance only around this portion drops Luminances are non-uniform between left side and right side

PERIPHERAL LIGHT AMOUNT CORRECTION APPARATUS, PERIPHERAL LIGHT AMOUNT CORRECTION METHOD, ELECTRONIC INFORMATION DEVICE, CONTROL PROGRAM AND READABLE RECORDING MEDIUM

CROSS-REFERENCE TO RELATED APPLICATION(S)

This application is a National Phase of International Application No. PCT/JP2006/322124 with an International Filing Date of Nov. 6, 2006, which claims priority to Japanese Application No. 2005-325201, filed on Nov. 9, 2005, where the above applications are incorporated by reference herein in their entireties.

TECHNICAL FIELD

The present invention relates to: a peripheral light amount correction apparatus for correcting a light amount at a periphery of an image capturing screen having a subject image captured thereon through an image capturing lens; a peripheral light amount correction method using the peripheral light amount correction method; an electronic information device, such as a digital camera (e.g., digital video camera and digital still camera), an image input camera, a scanner, a facsimile and a camera-equipped cell phone device having a digital camera module mounted thereon, using a solid-state image capturing device, including the peripheral light amount correction apparatus, for an image capturing section; a control program for causing a computer to execute the peripheral light amount correction method; and a computer-readable recording medium having the control program recorded thereon.

BACKGROUND ART

Generally, a camera using an image capturing lens has a problem of shading in that a light amount of a captured image decreases tending away from the center of an image capturing screen and the light amount at a periphery of an image capturing screen is insufficient. When a miniaturization or cost minimization of an optical system (lens) is intended, performance of various functions of the camera is likely to become unsatisfactory.

Therefore, in a captured image captured by using such a camera, a problem occurs in which a light amount at a peripheral portion of an image capturing screen is smaller than that of a central portion, resulting in a decrease of a luminance level. In a digital camera (e.g., digital video camera and digital still camera) and a camera-equipped cell phone device, a peripheral light amount correction method is used in order to correct the insufficient light amount at a periphery by signal processing.

FIG. 8 is a graph showing a relationship between a lens position with respect to a light receiving face of a conventional image capturing element and a light amount (luminance) level. In FIG. 8, a horizontal axis indicates a position of a lens, and a vertical axis indicates a level of a light amount at that position.

As shown in curves f1 to f3 of FIG. 8, a level of a light amount incident on a plurality of light receiving sections (image capturing area) of the image capturing element becomes smaller toward a peripheral portion from the center of an image capturing lens. Therefore, a peripheral light amount process is performed in which a gain coefficient of a light amount becomes larger from the center to the peripheral portion of the lens such that the light amount in an entire image (image screen) becomes uniform.

As such a peripheral light amount correction method, for example, Reference 1 and Reference 2 disclose extracting a contour component of a picture signal to generate a contour correction signal and performing a gain control by for example a parabolic wave signal such that a gain become larger toward a peripheral portion of a captured image, so that a flat resolution having uniform brightness (luminance) in an entire image screen is obtained.

Reference 3 discloses a peripheral light amount correction method for weighting the contour correction signal described above based on a response function to improve a resolution.

Reference 4 discloses a peripheral light amount correction method for generating a contour correction signal in accordance with frequency characteristic of an image capturing lens so as to perform a correction process in accordance with the frequency characteristic of the lens.

Reference 5 discloses a peripheral light amount correction method for generating a correction signal such that correction amplification degree becomes larger as a state of a camera diaphragm is closer to an open state so as to perform a correction process in accordance with a camera diaphragm state.

Reference 6 discloses a peripheral light amount correction method in a camera equipped with a zoom function for using peripheral light amount decrease data in accordance with an opening degree of a lens diaphragm or a zoom magnification for each lens so as to perform an appropriate correction in accordance with the opening degree of the lens diaphragm or the zoom magnification All the conventional techniques described above control a gain for performing a contour correction in a concentric manner using the center of a captured image as its origin.

FIG. 9 is a block diagram showing an exemplary structure of a conventional shading correction circuit shown in Reference 5.

In FIG. 9, an optical picture signal V0 output from an image capturing lens system 101 is converted into an electric image signal V1 by a photoelectric conversion circuit 102 and then output to an image reproduction section via a shading correction circuit 110. This picture signal V1 is supplied to a diaphragm control circuit 103, and a diaphragm control signal C0 for automatically adjusting a diaphragm of the image capturing lens system 101 is fed back to the image capturing lens system 101. This diaphragm signal C0 is input to a diaphragm adjusting mechanism (not shown) in the image capturing lens system 101.

The shading correction circuit 110 includes: a first gain control circuit 111 for correcting deterioration of a light amount at a periphery of a picture signal V1 obtained from the photoelectric conversion circuit 102; a first parabolic signal generation circuit 112, to which a horizontal driving signal HD is input, wherein the horizontal driving signal HD is created from a horizontal synchronization signal contained in the picture signal V1; a second parabolic signal generation circuit 113, to which a vertical driving signal VD is input, wherein the vertical driving signal VD is created from a vertical synchronization signal contained in the picture signal V1; an adder 114 for adding a first parabolic signal P1 and a second parabolic signal P2 respectively generated by the first parabolic signal generation circuit 112 and the second parabolic signal generation circuit 113; and a second gain control circuit 115 having an output terminal of the adder 114 connected thereto.

A diaphragm control signal C1 from the diaphragm control circuit 103 is input to a control section of the second gain control circuit 115, and a shading correction signal C2 from the second gain control circuit 115 is input to a control section of the first gain control circuit 111.

At the first parabolic signal generation circuit 112 and the second parabolic signal generation circuit 113, the first parabolic signal P1 and the second parabolic signal P2 which are synchronized with the horizontal driving signal HD and the vertical driving signal VD are created based on the horizontal driving signal HD and the vertical driving signal VD, respectively and then input to the adder 114.

A level of the diaphragm control signal C1 created by the diaphragm control circuit 103 is increased as a diaphragm of the image capturing lens system 101 opens, and a gain of the second gain control circuit 115 is adjusted in proportion to the level of the diaphragm control signal C1. A result of adding the first parabolic signal P1 and the second parabolic signal P2 is input to the second gain control circuit 115 from the adder 114, and the shading correction signal C2 having amplitude corresponding to the diaphragm is output to the first gain control circuit 111.

The first gain control circuit 111 indicates a gain characteristic corresponding to a diaphragm under the control of the shading correction signal C2 and indicates the gain characteristic corresponding to degradation of a light amount at a periphery in accordance with the diaphragm. Thus, a correction for the light amount at the periphery is performed in accordance with the diaphragm. In other words, the more squeezed the diaphragm is, the darker the brightness at the periphery becomes. As such, the more squeezed the diaphragm is, the larger a correction amplification degree (gain) at the periphery becomes.

[Reference 1] Japanese Laid-Open Publication No. 07-74987
[Reference 2] Japanese Laid-Open Publication No. 2003-198880
[Reference 3] Japanese Laid-Open Publication No. 2002-77722
[Reference 4] Japanese Laid-Open Publication No. 2005-150986
[Reference 5] Japanese Laid-Open Publication No. 01-186064
[Reference 6] Japanese Laid-Open Publication No. 2003-110936

DISCLOSURE OF THE INVENTION

All the peripheral light amount correction methods disclosed in References 1 to 6 described above alter a gain for performing a contour correction in a concentric manner toward an end of an image screen using the center of the image screen as its origin, so that an image having a uniform light amount in the entire image screen is obtained for the image which is supposed to have the uniform light amount in the entire image screen.

For example, as shown in curves f1 to f3 of FIG. 8, a level of a light amount incident on a plurality of light receiving sections (image capturing area) of the image capturing element becomes smaller toward a peripheral portion from the center of an image capturing lens. Thus, when a gain coefficient of a light amount of becomes larger toward an end of the lens in a concentric manner using the center of lens as its origin in accordance with, for example, a correction function, a light amount in the entire image screen can be uniform for the image which is supposed to have the uniform light amount in the entire image screen.

However, in an actual product, there is a case in which a lens and a light receiving face of an image capturing element cannot be set parallel to each other due to a distortion resulting from a precision of the lens itself or a poor mounting precision of the lens. For example, a camera module mounted on such as a cell phone device cannot mount an expensive lens in consideration of cost, or mounting precision of the lens cannot be so high since the camera module is mass-produced. When a lens is mounted to, for example, a camera module used for a cell phone device, the lens is mounted having both ends of the lens held by a housing of the camera module. Therefore, a design precision of the housing is exactly applied to a mounting precision of the lens. As such, there is a concern that an optical axis of a lens and a line perpendicular to the center of a light receiving face of an image capturing element do not match each other (positional displacement) and a lens is set tilted. In particular, when a lens is set tilted, a light amount in the entire image screen cannot be uniform for the image which is supposed to have the uniform light amount in the entire image screen.

FIG. 10 is a graph showing a relationship between a lens position with respect to a light receiving face of a conventional image capturing element and a light amount level, when there is a problem regarding a mounting precision of a lens. A horizontal axis indicates a position of a lens, and a vertical axis indicates a level of a light amount at that position.

In this case, the mounting precision of the lens is poor and thus, the lens is not mounted in parallel with the light receiving face of the image capturing element such as a CCD or a CMOS. As such, even though a level of a light amount is smaller toward each periphery from the center of the lens, the level of the light amount is not symmetrical with respect to each periphery, as shown in graphs z1 to z3 of FIG. 10.

Accordingly, when the lens and the light receiving face of the image capturing element are set in parallel with each other as shown in FIG. 11(a), luminances are uniform with respect to each left and right sides and become concentric. Therefore, a conventional peripheral light amount correction method can alter a gain for performing a contour correction in a concentric manner toward an end of an image screen using the center of the image screen as its origin, so that an image having a uniform light amount in the entire image screen is obtained for the image which is supposed to have the uniform light amount in the entire image screen. In contrast to this, when the lens and the light receiving face of the image capturing element are not set in parallel with each other as shown in FIG. 11(b), luminances are not uniform with respect to each left and right sides, and has an ellipse, for example, sided on the left side of an image screen. Therefore, a luminance in a hatched part is lower than a luminance added with a normal corrected value even if the conventional peripheral light amount correction method is used. As a result, a light amount in the entire image screen cannot be uniform for an image, which is supposed to have the uniform light amount in the entire image screen.

Further, another method is considered in which memory having words, the number of which is the same as that of pixels of an image capturing element, is provided and a gain alternation coefficient for contour correction is set. However, in this method, as the number of pixel increases, an equivalent number of memories is required, thus causing an increase of a manufacturing cost and a decrease of processing speed. Therefore, this is not a feasible method for solution.

The present invention is intended to solve the conventional problems described above. The objective of the present invention is to provide: a peripheral light amount correction apparatus capable of correcting the insufficient peripheral light amount due to the lens shading as well as correcting the non-uniformity of light amount onto light receiving faces of an image capturing element due to a distortion resulting from a precision of the lens itself or a poor mounting precision of the lens to obtain a uniform resolution in an entire captured image screen for an image which is supposed to have a uniform light amount in the entire image screen while suppressing an increase of a manufacturing cost and a decrease of a processing speed; a peripheral light amount correction method using the peripheral light amount correction apparatus; an electronic information device using a solid-state image capturing device, including the peripheral light amount correction apparatus, for an image capturing section; a control program for causing a computer to execute the peripheral light amount correction method; and a computer-readable recording medium having the control program recorded thereon.

A peripheral light amount correction apparatus according to the present invention for correcting a peripheral light amount at an image capturing area for capturing a subject image by an image capturing element through a light collecting lens includes: difference coefficient value obtaining means for obtaining a difference coefficient value of an integrated/averaged value of each area for each pixel data from the image capturing element, each area being point-symmetrical with respect to the center of the image capturing area; peripheral light amount correction function conversion means for converting a basic peripheral light amount correction function into a new peripheral light amount correction function based on the difference coefficient value; and peripheral light amount correction means for performing a peripheral light amount correction on each pixel data from the image capturing element based on the new peripheral light amount correction function, thereby the objective described above being achieved. Preferably, the peripheral light amount correction function conversion means in the peripheral light amount correction apparatus according to the present invention includes: pixel coordinate conversion means for performing a conversion into new pixel coordinate values of the image capturing area based on the difference coefficient value; and peripheral light amount correction function section for converting the basic peripheral light amount correction function into the new peripheral light amount correction function based on the new pixel coordinate values. In addition, a peripheral light amount correction apparatus according to the present invention for correcting a peripheral light amount at an image capturing area for capturing a subject image by an image capturing element through a light collecting lens includes: difference coefficient value obtaining means for obtaining a difference coefficient value of an integrated/averaged value of each area for each pixel data from the image capturing element, each area being point-symmetrical with respect to the center of the image capturing area; pixel coordinate conversion means for performing a conversion into new pixel coordinate values of the image capturing area based on the difference coefficient value; peripheral light amount correction function conversion means for converting a basic peripheral light amount correction function into a new peripheral light amount correction function based on the difference coefficient value; and peripheral light amount correction means for performing a peripheral light amount correction on each pixel data from the image capturing element based on the new peripheral light amount correction function, thereby the objective described above being achieved.

Preferably, the difference coefficient value obtaining means in the peripheral light amount correction apparatus according to the present invention computes the difference coefficient value of the integrated/averaged value for a luminance value or an RGB data value of each pixel data.

Still preferably, the areas in the peripheral light amount correction apparatus according to the present invention are at least one of: two areas, the distance of which from the center of a screen of the image capturing area to the center of the gravity of each area in one direction is equal to each other; and two areas, the distance of which is equal to each other in a direction crossing the one direction.

Still preferably, the one direction and the direction crossing the one direction in the peripheral light amount correction apparatus according to the present invention are an up-and-down direction and a left-and-right direction orthogonal to each other in the screen of the image capturing area.

Still preferably, the integrated/averaged value in the peripheral light amount correction apparatus according to the present invention is obtained by dividing an integrated value of each area by the number of pixels of the respective area.

Still preferably, the difference coefficient value obtaining means in the peripheral light amount correction apparatus according to the present invention computes a value obtained by dividing the difference value of the integrated/averaged value of each area by a distance between respective areas as the difference coefficient value.

Still preferably, the difference coefficient value obtaining means in the peripheral light amount correction apparatus according to the present invention computes the difference coefficient value for each pixel data from the image capturing element, an image for each pixel data being captured such that a light amount of the image is uniform in the entire screen.

Still preferably, the difference coefficient value obtaining means in the peripheral light amount correction apparatus according to the present invention computes the difference coefficient value for each pixel data from the image capturing element, an image for each pixel data being captured such that a light amount of the image is graded in a concentric manner.

Still preferably, when the difference coefficient value is computed for each pixel after a peripheral light amount correction has been performed on each pixel data from the image capturing element, the peripheral light amount correction apparatus according to the present invention further includes, as the difference coefficient value obtaining means in the peripheral light amount correction apparatus according to the present invention, correction check means capable of checking whether or not the peripheral light amount correction has been appropriately performed depending on whether or not the computed difference coefficient value is within a predetermined reference range.

Still preferably, the peripheral light amount correction apparatus according to the present invention further includes coordinate generation means for numbering input horizontal pixel coordinates and input vertical pixel coordinates one by one using the uppermost left-hand corner on the screen in each pixel data from the image capturing element as original coordinates (0, 0) and obtaining coordinate (X, Y) values on the screen, and the difference coefficient value obtaining means performs an integration process on each area using the coordinate (X, Y) values.

Still preferably, in the peripheral light amount correction apparatus according to the present invention, the difference coefficient value obtaining means further includes means for comparing coordinate values of each area and the coordinate (X, Y) values and determining whether or not both match each other, and the difference coefficient value obtaining means computes the integrated/averaged value for each pixel data for the coordinate (X, Y) values when both match each other and computes the difference coefficient value using the integrated/averaged value.

Still preferably, the pixel coordinate conversion means in the peripheral light amount correction apparatus according to the present invention converts the coordinate (X, Y) values into the new pixel coordinate values based on the difference coefficient value.

Still preferably, when frames are changed, the pixel coordinate conversion means in the peripheral light amount correction apparatus according to the present invention detects this and performs a coordinate conversion process using the difference coefficient value prior to changing to coordinate values of the next frame to be changed.

Still preferably, the pixel coordinate conversion means in the peripheral light amount correction apparatus according to the present invention fine-adjusts the new pixel coordinate values using an adjustment coefficient for adjusting a correction degree.

Still preferably, the peripheral light amount correction function conversion means in the peripheral light amount correction apparatus according to the present invention uses, as the basic peripheral light amount correction function, at least one peripheral light amount correction function for altering gain values of a contour correction in a concentric manner using the center of the screen as the origin.

Still preferably, the peripheral light amount correction means in the peripheral light amount correction apparatus according to the present invention performs a peripheral light amount correction on a luminance value or an RGB data value of each image data from the image capturing element.

Still preferably, the peripheral light amount correction apparatus according to the present invention further includes synchronization signal generation means for generating an image capturing element operating synchronization signal for controlling a driving timing of the image capturing element and an area designating synchronization signal for performing a coordinate computation on each pixel data from the image capturing element.

Still preferably, the synchronization signal generation means in the peripheral light amount correction apparatus according to the present invention outputs a horizontal synchronization signal and a vertical synchronization signal to the coordinate generation means, and the coordinate generation means includes a horizontal counter for counting the horizontal synchronization signal and a vertical counter for counting the vertical synchronization signal and outputs the coordinate (X, Y) values based on the horizontal counter and the vertical counter.

Still preferably, the difference coefficient value obtaining means in the peripheral light amount correction apparatus according to the present invention includes: an integrating/averaging circuit for computing the integrated/averaged value of each area for each pixel data from the image capturing element; and a coefficient generation circuit for obtaining an X difference coefficient value for performing a conversion on an X coordinate and a Y difference coefficient value for performing a conversion on a Y coordinate using the integrated/averaged value from the integrating/averaging circuit.

Still preferably, the integrating/averaging circuit in the peripheral light amount correction apparatus according to the present invention includes: a comparing circuit for comparing the coordinate values of each area with the coordinate (X, Y) values; an integrating circuit for integrating, when a result compared by the comparing circuit is matched, a luminance value of each pixel data of the matched coordinate (X, Y) values for each area; and an averaging circuit for computing the integrated/averaged value by dividing the integrated value of each area by the number of pixels of the respective area.

Still preferably, the coefficient generation circuit in the peripheral light amount correction apparatus according to the present invention includes: a difference circuit for computing a difference value of the integrated/averaged value of each area; and a coefficient circuit for computing a value obtained by dividing the difference value by a distance between the respective areas as the difference coefficient value.

Still preferably, in the peripheral light amount correction apparatus according to the present invention, when one of an auto focus, an optical zoom and a macro function is included as a lens function of the collecting lens, the difference coefficient value obtaining means obtains the difference coefficient value corresponding to a moved position of the light collecting lens and stores it in storage means.

A peripheral light amount correction method according to the present invention for correcting a peripheral light amount at an image capturing area for capturing a subject image by an image capturing element through a light collecting lens includes: difference coefficient value obtaining step of obtaining a difference coefficient value of an integrated/averaged value of each area for each pixel data from the image capturing element, each area being point-symmetrical with respect to the center of the image capturing area; peripheral light amount correction function conversion step of converting a basic peripheral light amount correction function into a new peripheral light amount correction function based on the difference coefficient value; and peripheral light amount correction step of performing a peripheral light amount correction on each pixel data from the image capturing element based on the new peripheral light amount correction function, thereby the objective described above being achieved. Preferably, the peripheral light amount correction function conversion step includes in the peripheral light amount correction method according to the present invention: pixel coordinate conversion step of performing a conversion into new pixel coordinate values of the image capturing area based on the difference coefficient value; and a step of converting the basic peripheral light amount correction function into the new peripheral light amount correction function based on the new pixel coordinate values. In addition, a peripheral light amount correction method according to the present invention for correcting a peripheral light amount at an image capturing area for capturing a subject image by an image capturing element through a light collecting lens includes: difference coefficient value obtaining step of obtaining a difference coefficient value of an integrated/averaged value of each area for each pixel data from the image capturing element, each area being point-symmetrical with respect to the center of the image capturing area; pixel coordinate conversion step of performing a conversion into new pixel coordinate values of the image capturing area based on the difference coefficient value; peripheral light amount correction function conversion step of converting a basic peripheral light amount correction function into a new peripheral light amount correction function based on the difference coefficient value; and peripheral light amount correction step of performing a peripheral light amount correction on each pixel data from the image capturing element based on the new peripheral light amount correction function, thereby the objective described above being achieved.

Preferably, the difference coefficient value obtaining step in the peripheral light amount correction-method according to the present invention computes the difference coefficient value of the integrated/averaged value for a luminance value or an RGB data value of each pixel data.

Still preferably, the areas in the peripheral light amount correction method according to the present invention in the difference coefficient value obtaining step are at least one of: two areas, the distance of which from the center of a screen of the image capturing area to the center of the gravity of each area in one direction is equal to each other; and two areas, the distance of which is equal to each other in a direction crossing the one direction.

Still preferably, the one direction and the direction crossing the one direction in the peripheral light amount correction method according to the present invention are an up-and-down direction and a left-and-right direction orthogonal to each other in the screen of the image capturing area.

Still preferably, the integrated/averaged value in the peripheral light amount correction method according to the present invention is obtained by dividing an integrated value of each area by the number of pixels of the respective area.

Still preferably, the difference coefficient value obtaining step in the peripheral light amount correction method according to the present invention computes a value obtained by dividing the difference value of the integrated/averaged value of each area by a distance between respective areas as the difference coefficient value.

Still preferably, the difference coefficient value obtaining step in the peripheral light amount correction method according to the present invention computes the difference coefficient value for each pixel data from the image capturing element, an image for each pixel data being captured such that a light amount of the image is uniform in the entire screen.

Still preferably, the difference coefficient value obtaining step in the peripheral light amount correction method according to the present invention computes the difference coefficient value for each pixel data from the image capturing element, an image for each pixel data being captured such that a light amount of the image is graded in a concentric manner.

Still preferably, when the difference coefficient value is computed for each pixel after a peripheral light amount correction has been performed on each pixel data from the image capturing element, the peripheral light amount correction method according to the present invention further includes, as the difference coefficient value obtaining step in the peripheral light amount correction method according to the present invention, correction check step capable of checking whether or not the peripheral light amount correction has been appropriately performed depending on whether or not the computed difference coefficient value is within a predetermined reference range.

Still preferably, the peripheral light amount correction method according to the present invention further includes coordinate generation step of numbering input horizontal pixel coordinates and input vertical pixel coordinates one by one using the uppermost left-hand corner on the screen in each pixel data from the image capturing element as original coordinates (0, 0) and obtaining coordinate (X, Y) values on the screen prior to the difference coefficient value obtaining step in the peripheral light amount correction method according to the present invention, and performing an integration process on each area using the coordinate (X, Y) values in the difference coefficient value obtaining step.

Still preferably, in the peripheral light amount correction method according to the present invention, the difference coefficient value obtaining step further includes a step of comparing coordinate values of each area and the coordinate (X, Y) values and determining whether or not both match each other, and the difference coefficient value obtaining step computes the integrated/averaged value for each pixel data for the coordinate (X, Y) values when both match each other and computes the difference coefficient value using the integrated/averaged value.

Still preferably, the pixel coordinate conversion step in the peripheral light amount correction method according to the present invention converts the coordinate (X, Y) values into the new pixel coordinate values based on the difference coefficient value.

Still preferably, when frames are changed, the pixel coordinate conversion step in the peripheral light amount correction method according to the present invention detects this and performs a coordinate conversion process using the difference coefficient value prior to changing to coordinate values of the next frame to be changed.

Still preferably, the peripheral light amount correction function conversion step in the peripheral light amount correction method according to the present invention uses, as the basic peripheral light amount correction function, at least one peripheral light amount correction function for altering gain values of a contour correction in a concentric manner using the center of the screen as the origin.

Still preferably, the peripheral light amount correction step in the peripheral light amount correction method according to the present invention performs a peripheral light amount correction on a luminance value or an RGB data value of each image data from the image capturing element.

An electronic information device according to the present invention uses a solid-state image capturing device including a peripheral light amount correction apparatus described above according to the present invention for an image capturing section, thereby the objective described above being achieved.

A control program according to the present invention causes a computer to execute each step of a peripheral light amount correction method described above according to the present invention, thereby the objective described above being achieved.

A computer-readable recording medium has a control program described above according to the present invention recorded thereon, thereby the objective described above being achieved.

Hereinafter, the function of the present invention owing to the structure described above will be described.

The present invention individually computes an integrated/averaged value of pixel data (luminance values and RGB data values) supplied from an image capturing element for each of, for example, four areas, wherein the distance from the center of a screen to the center of gravity of the four areas in a horizontal direction and a vertical direction are equal to each other. A difference coefficient value is computed from this integrated/averaged value. New coordinates are generated based on this difference coefficient value. The new coordinates are used to alter a basic correction function such that gains of a contour correction are altered in a concentric manner using the center of the image as its origin so as to perform a peripheral light amount correction on each pixel data from an image capturing element.

For example, even in the case of the non-uniformity of an input image onto light receiving faces of an image capturing element due to a distortion resulting from a precision of the lens itself or a poor mounting precision of the lens, it is possible to extract light amount information of the input image by performing an integration and averaging of each pixel data of the input image and obtaining difference coefficient values thereof. Therefore, with a conversion of pixel coordinates into new pixel coordinates based on the difference coefficient values, it is possible to convert a basic correction function for correcting lens shading into a function corresponding to the input image.

Since only coordinates to be input to peripheral light amount correction means are newly generated, a conventional circuit can be used as the peripheral light amount correction means. Thus, it is possible to suppress an increase of cost and a decrease of processing speed to a minimum.

Further, it is possible to check whether or not a correction has been appropriately performed on a corrected image by using a coefficient for a coordinate conversion.

As described above, according to the present invention, it is possible, at a low cost with precision, to correct insufficient light amount at a periphery due to lens shading and also possible to correct the non-uniformity of light amount at the periphery due to a distortion resulting from a precision of the lens itself or a poor mounting precision (positional displacement or tilt) of the lens, which cannot be corrected with conventional techniques. Therefore, it is possible to improve the yield of the whole digital camera product (e.g., camera module), which is conventionally treated as defective product. Further, since it is possible to check whether or not a correction has been appropriately performed on a corrected image, there is no need for newly introducing an inspection apparatus.

Figure 1:
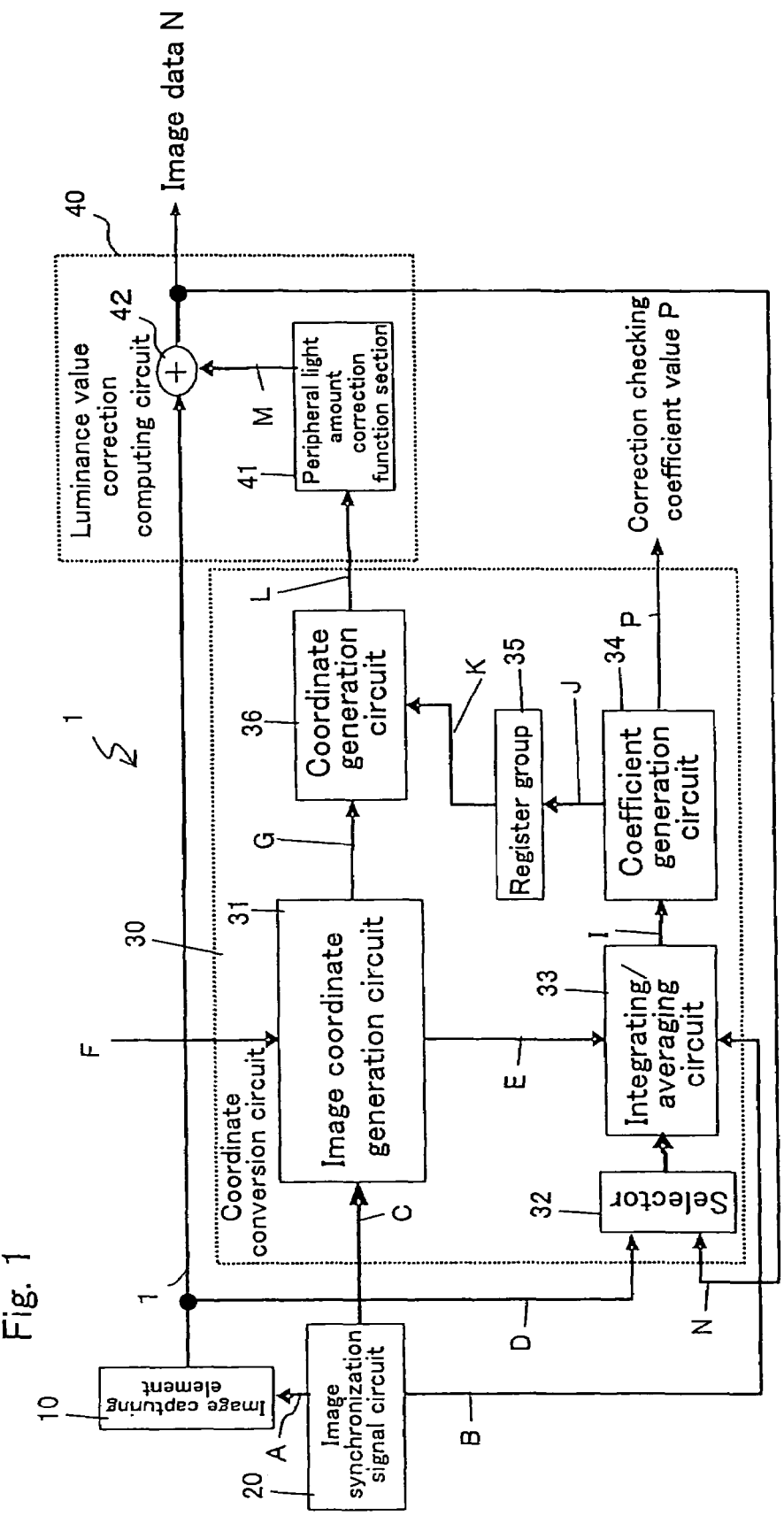
FIG. 1 is a block diagram showing an exemplary structure of a peripheral light amount correction circuit for a digital camera according to an embodiment of the present invention.

1 peripheral light amount correction circuit (peripheral light amount correction apparatus)
10 image capturing element
20 image synchronization signal generation circuit
30 coordinate conversion circuit
31 image coordinate generation circuit (coordinate generation means)
32 selector
33 integrating/averaging circuit
34 coefficient generation circuit (integrating/averaging circuit and coefficient generation circuit as difference coefficient value obtaining means)
35 register group
36 coordinate generation circuit (pixel coordinate conversion means)
40 luminance value correction computing circuit
41 peripheral light amount correction function section (peripheral light amount correction function conversion means)
42 adder (peripheral light amount correction means)
A image capturing element operating synchronization signal
B area designating synchronization signal (area designating vertical synchronization signals VArea1, VArea2, VArea3, VArea4 and area designating horizontal synchronization signals HArea1, HArea2, HArea3, HArea4)
C image valid area designating synchronization signal (vertical synchronization signal VREF and horizontal synchronization signal HREF)
D, N image data
E input pixel coordinate values HPixNum, VPixNum
F image central coordinates (X center, Y center)
G coordinates XPix, YPix corresponding to each pixel of input image
I integrated/averaged luminance value (AveL(1), AveL(2), AveL(3), AveL(4))
J coefficient (difference coefficient; CoeffX, CoeffY, CoeffZ)
K coefficient corresponding to a lens position (CoeffX, CoeffY, CoeffZ)
L coordinates for a correction circuit (NewXpix, NewYpix)
M correction value
N corrected image data
P correction checking coefficient (CoeffX, CoeffY)

BEST MODE FOR CARRYING OUT THE INVENTION

Hereinafter, cases will be described with reference to the accompanying figures in which embodiments of a peripheral light amount correction apparatus and a peripheral light amount correction method according to the present invention are applied to a peripheral light amount correction circuit for a digital camera and a peripheral light amount correction method using the peripheral light amount correction circuit.

FIG. 1 is a block diagram showing an exemplary structure of a peripheral light amount correction circuit for a digital camera according to an embodiment of the present invention.

In FIG. 1, the peripheral light amount correction circuit 1 for the digital camera according to the present embodiment includes: an image synchronization signal generation circuit (image synchronization signal circuit) 20 as image synchronization signal generation means for outputting various image synchronization signals to an image capturing element 10 (e.g., CCD or CMOS image sensor); a coordinate conversion circuit 30 for generating a corrected coordinate value from image data D from the image capturing element 10; and a luminance value correction computing circuit 40 as a correction computing circuit for computing a peripheral light amount correction based on the corrected coordinate value.

In the image capturing element 10, light collecting lenses (not shown) are arranged above a plurality of light receiving sections (light receiving faces, image capturing area; not shown), which are arranged in a two-dimensional matrix, so that incident light (subject light) is focused on the light receiving faces via the light collecting lenses to capture a desired image.

The image synchronization signal generation circuit 20 outputs an image capturing element operating synchronization signal A for controlling an image capturing timing of the image capturing element 10. The image capturing element operating synchronization signal A is used for (i) controlling a read gate for reading, to an electric charge transfer section, a signal electric charge photoelectrically converted at the plurality of light receiving sections of the image capturing area, (ii) controlling a transfer gate for performing an electric charge transfer of the signal electric charge to an electric charge detection section, (iii) controlling an electronic shutter function and a diaphragm function (exposure time and reset) and the like.

In addition, the image synchronization signal generation circuit 20 outputs, to an integrating/averaging circuit 33 making up the coordinate conversion circuit 30, area designating vertical synchronization signals VArea1, VArea2, VArea3, VArea4 and area designating horizontal synchronization signals HArea1, HArea2, HArea3, HArea4 as area designating synchronization signal B for designating areas for computation. The integrating/averaging circuit 33 will be described later. The numerals 1 to 4 added to the area designating synchronization signal B correspond to the numerals for areas shown in FIG. 2.

Further, the image synchronization signal generation circuit 20 outputs, to an image coordinate generation circuit 31 making up the coordinate conversion circuit 30, vertical synchronization signal VREF and horizontal synchronization signal HREF as image valid area designating synchronization signal C for designating valid areas in an image in image data D output from the image capturing element 10. The image coordinate generation circuit 31 will be described later.

The coordinate conversion circuit 30 includes: the image coordinate generation circuit 31 as coordinate generation means for numbering input horizontal pixel coordinates and input vertical pixel coordinates one by one using the uppermost left-hand corner on a screen in each pixel data from the image capturing element 10 as original coordinates (0, 0), and obtaining coordinate (X, Y) values on the screen; a selector 32 as pixel data selection switching means; the integrating/averaging circuit 33 and a coefficient generation circuit 34 as difference coefficient value obtaining means for obtaining a difference coefficient value of integrated/averaged values for areas for each pixel data from the image capturing element 10, wherein each area is point-symmetrical with respect to the center of the image capturing area; a register group 35 as storage means; a coordinate generation circuit 36 as pixel coordinate conversion means for performing a conversion into new pixel coordinate values in the image capturing area based on the difference coefficient value, so that the coordinate conversion circuit 30 generates and outputs the new coordinate values to be input to a luminance value correction computing circuit 40.

The image coordinate generation circuit 31 uses vertical synchronization signal VREF and horizontal synchronization signal HREF of image valid area designating synchronization signal C input from the image synchronization signal generation circuit 20 to generate (number) input vertical pixel coordinates VPixNum and input horizontal pixel coordinates HPixNum within the circuit using the uppermost left-hand corner in an input image as origin [coordinates (0, 0)] and output them as input image coordinate value signal E. In addition, the image coordinate generation circuit 31 uses a center setting value signal F for the center coordinates (X center, Y center) of the image capturing image (image capturing area) for computation by the following (Expression 1) and (Expression 2) such that X coordinate XPix and Y coordinate YPix corresponding to each pixel in the input image are output as a coordinate signal G indicating X coordinate and Y coordinate.

$X$ coordinate: $X\text{Pix}=H\text{PixNum}-X\text{ center}$ \hfill (Expression 1)

$Y$ coordinate: $Y\text{Pix}=H\text{PixNum}-Y\text{ center}$ \hfill (Expression 2)

The selector 32 selects either image data D from the image capturing element 10 or corrected image data N for correction check (which will be described later) by a selection control signal (not shown) so as to supply it to the integrating/averaging circuit 33.

Figure 2:
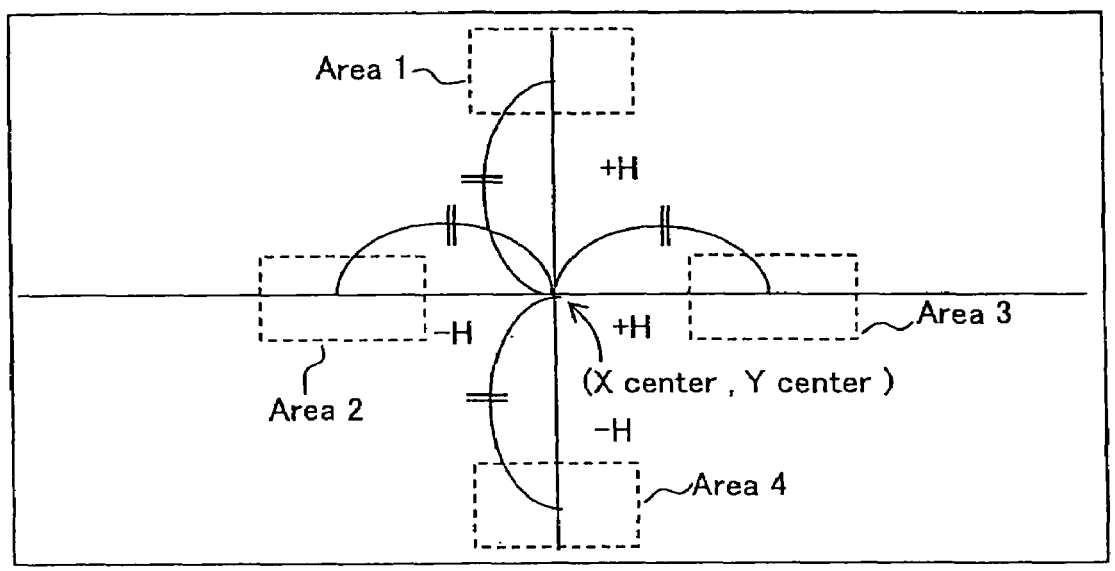
FIG. 2 is a diagram showing areas, in which integrated/averaged values are computed, in the peripheral light amount correction circuit for the digital camera in FIG. 1.

The integrating/averaging circuit 33 uses area designating vertical synchronization signals VArea1, VArea2, VArea3, VArea4 and area designating horizontal synchronization signals HArea1, HArea2, HArea3, HArea4 as the area designating synchronization signals B input from the image synchronization signal generation circuit 20 to individually obtain integrated/averaged luminance value AveL(1) corresponding to area 1, integrated/averaged luminance value AveL(2) corresponding to area 2, integrated/averaged luminance value AveL(3) corresponding to area 3 and integrated/averaged luminance value AveL(4) corresponding to area 4 for four areas (predetermined areas on lines having equal distance from the center and orthogonal to each other) shown in FIG. 2 such that they are output as integrated/averaged luminance value signal I indicating integrated/averaged luminance values. In each of the four areas, the distance from the center of the gravity of each area to (X center, Y center) is set to have equal distance H. FIG. 2 shows area 1 having the center of the gravity thereof located at +H in Y direction (upper) from (X center, Y center); area 2 having the center of the gravity thereof located at −H in X direction (left) from (X center, Y center); area 3 having the center of the gravity thereof located at +H in X direction (right) from (X center, Y center); and area 4 having the center of the gravity thereof located at −H in Y direction (lower) from (X center, Y center).

The integrated/averaged luminance value of each of the four areas is obtained by the following (Expression 3).

Integrated/averaged luminance value: $\text{Ave}L(N)= \Sigma \text{Pix}(x,y)/\text{Pix}(\text{Num})$ \hfill (Expression 3)

where N is an integer from 1 to 4, Pix(x, y) is luminance components of each pixel in area N, and Pix(Num) is the number of pixels in a designated area.

The coefficient generation circuit 34 uses the following (Expression 4) and (Expression 5) for the integrated/averaged luminance values AveL(1), AveL(2), AveL(3), AveL(4) input from the integrating/averaging circuit 33 to obtain coefficient value CoeffX for performing a conversion on X coordinates and coefficient value CoeffY for performing a conversion on Y coordinates.

Coefficient of $X$ coordinate: $\text{Coeff} X= \text{Ave}L(1)-\text{Ave}L(4)$ \hfill (Expression 4)

Coefficient of $X$ coordinate: $\text{Coeff} X= \text{Ave}L(3)-\text{Ave}L(2)$ \hfill (Expression 5)

Coefficient value signal J indicating the coefficient values obtained at the coefficient generation circuit 34 is temporarily stored in the register group 35.

The coefficient values CoeffX and CoeffY are previously obtained, and when these values are obtained, an a captured image, an image is selected and used such that brightness (luminance) of the image is uniform in an image capturing screen (or image having the brightness thereof graded in a concentric manner; not only a tilt of a lens but also a displacement of a position of the lens can be detected as in the case of the image having uniform brightness), such as an image having white color in the entire image capturing screen. Such an image is captured, and the peripheral light amount correction circuit for the digital camera according to the present invention is operated. Coefficient values CoeffX and CoeffY obtained in this case are previously stored in the register group 35. Further, as a lens function, when an auto focus, an optical zoom, a macro mechanism and the like are included, coefficient values CoeffX and CoeffY are obtained in accordance with a moved position of a lens and stored in the register group 35. As such, an image appearing to have uniform luminance values is obtained for all the states of a lens for use.

Coordinate signal G (XPix and YPix) output from the image coordinate generation circuit 31 and coefficient value signal K (one set of CoeffX and CoeffY) in accordance with a state of a camera lens (moved position of lens), which is previously stored in the register group 35, are input to the coordinate generation circuit 36. Further, correaction coefficient value CoeffZ is input to the coordinate generation circuit 36 in the end in order to adjust a degree of the correction. At the coordinate generation circuit 36, a computation is performed by the following (Expression 6) and (Expression 7), and coordinate signal L indicating new coordinate values to be input to the luminance value correction computing circuit 40 is generated.

X coordinate for computing circuit for luminance value correction circuit: NewXPix=
Coeff Z×Coeff X×XPix  (Expression 6)

Y coordinate for computing circuit for luminance value correction circuit: NewYPix=
Coeff Z×Coeff Y×YPix  (Expression 7)

The luminance value correction computing circuit 40 includes: peripheral light amount correction function conversion means for converting a basic peripheral light amount correction function into a new peripheral light amount correction function based on the new pixel coordinate values; and peripheral light amount correction means for performing a peripheral light amount correction on each pixel data from the image capturing element 10 based on the new peripheral light amount correction function. In other words, at the luminance value correction computing circuit 40, the basic peripheral light amount correction function is converted into the new peripheral light amount correction function section 41 (peripheral light amount correction function conversion means) based on the coordinate signal L generated at the coordinate conversion circuit 30 to generate luminance value correcting value M, and the luminance value correcting value M is added at an adder 42 (peripheral light amount correction means) for pixel data D supplied from the image capturing element 10 to correct the luminance value, so that corrected image data N is generated and output.

Figure 3:
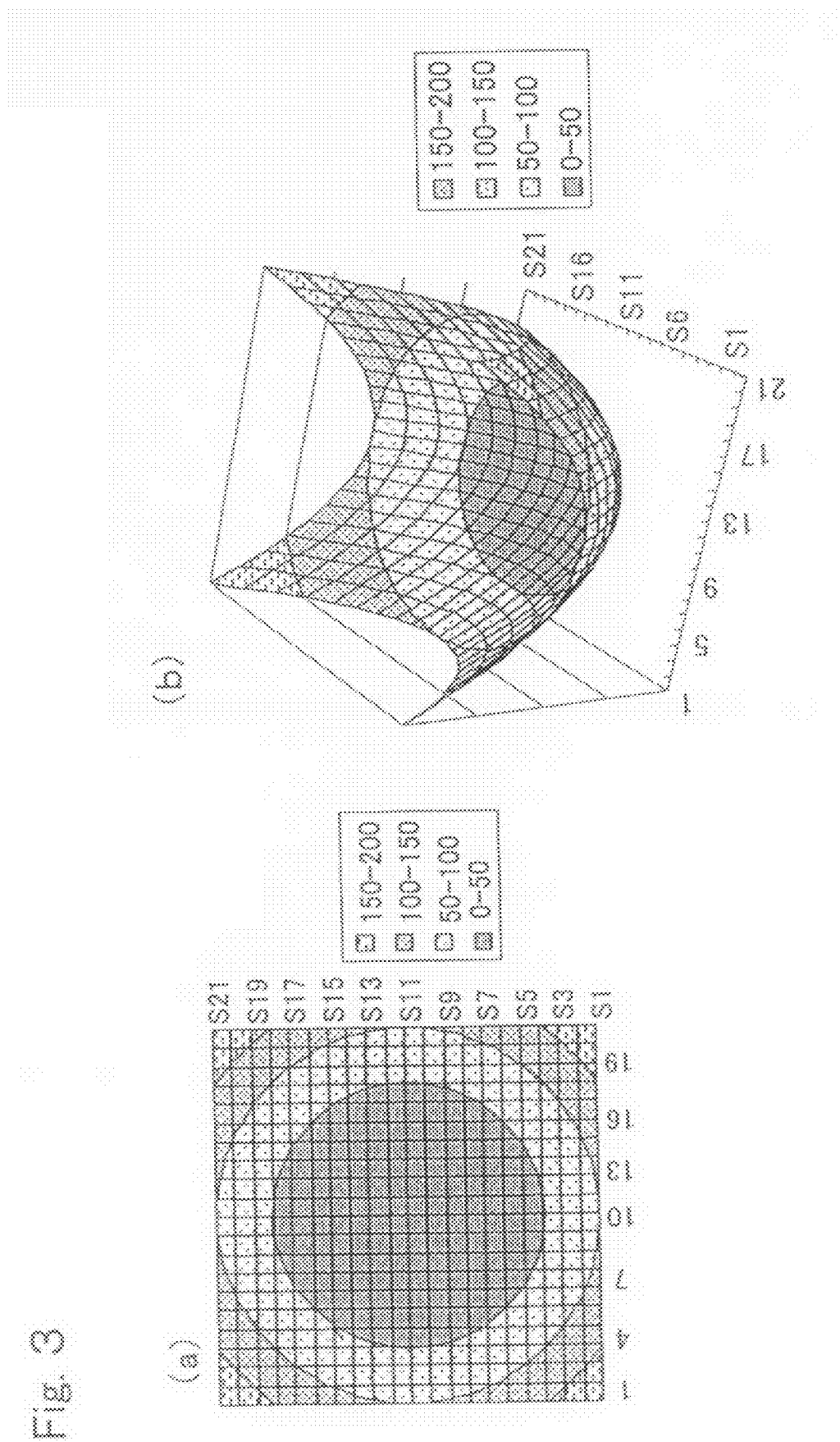
FIG. 3(a) and FIG. 3(b) are a diagram showing a basic peripheral light amount correction function.

The luminance value correction computing circuit 40 has, as the peripheral light amount correction function section 41, at least one basic correction function for altering gains of a contour correction in a concentric manner using the center of an image as the origin. As shown in FIG. 3(*a*) and FIG. 3(*b*), the peripheral light amount correction function section 41 is, for example, a function having a radial pattern such that gains of the contour correction become larger in a concentric manner toward the periphery from the center (11, S11). The gains of the contour correction of the peripheral light amount correction function shown in FIG. 3(*a*) and FIG. 3(*b*) become larger in a concentric manner toward the periphery from the center (11, S11). Correction is performed at light amount levels of 0 to 50 at a central portion, and at larger light amount levels of 50 to 100, 100 to 150 and 150 to 200 toward the periphery. FIG. 3(*a*) and FIG. 3(*b*) are figures showing a basic peripheral light amount correction function. FIG. 3(*a*) shows positions on a screen in a plane. FIG. 3(*b*) shows the positions on the screen in the X-Y plane and light amount levels to be corrected in the Z-axis.

Figure 4:
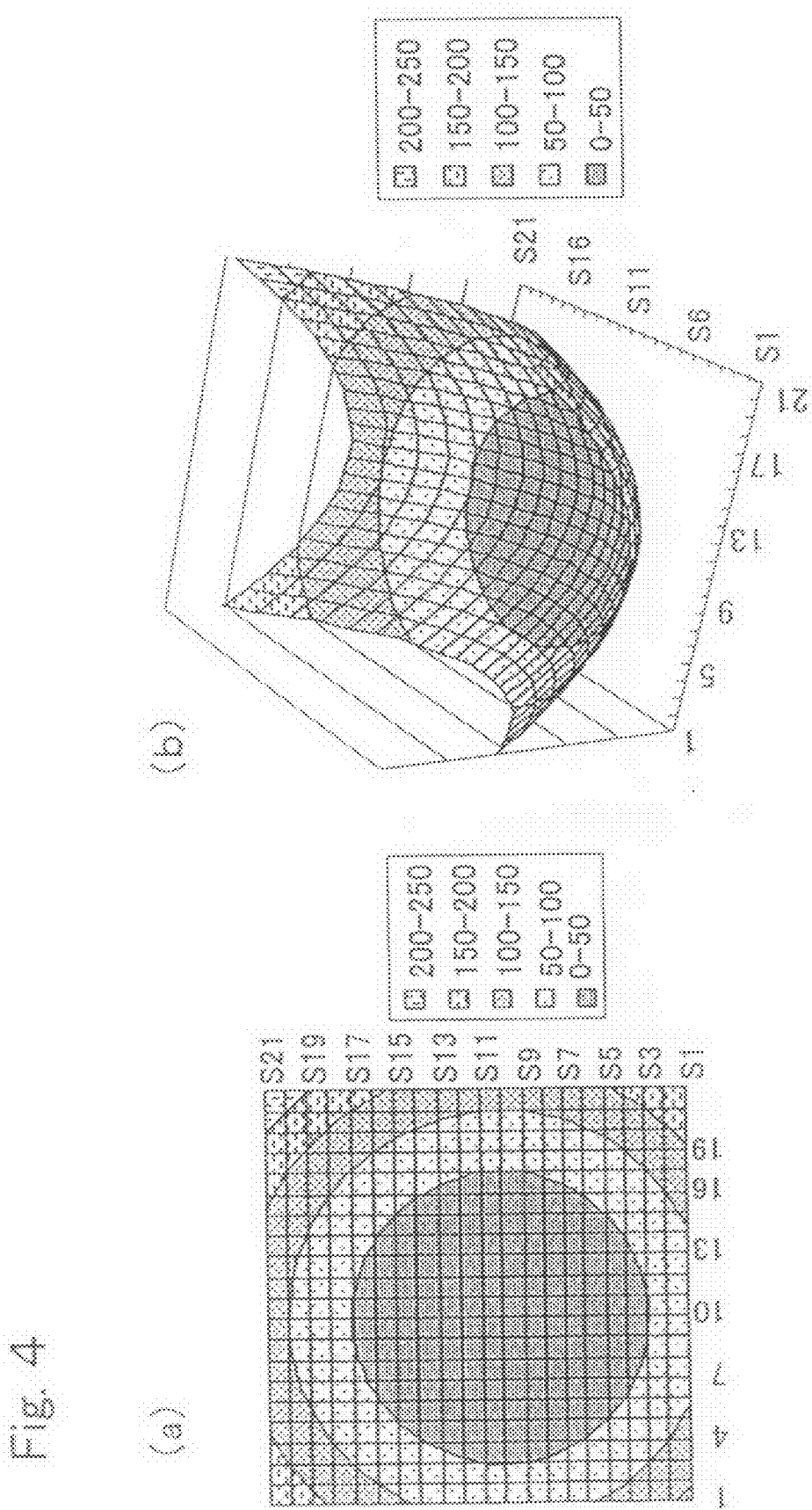
FIG. 4(a) and FIG. 4(b) are a diagram showing a peripheral light amount correction function converted by the peripheral light amount correction circuit for the digital camera according to the embodiment of the present invention.

With the use of coordinate values NewXPix and NewYPix supplied from the coordinate conversion circuit 30 for the peripheral light amount correction function section 41, a function as shown in FIG. 3(*a*) and FIG. 3(*b*) in the conventional technique is converted into a function as shown in FIG. 4(*a*) and FIG. 4(*b*), which has addressed the non-uniformity of a peripheral light amount. In the peripheral light amount correction function shown in FIG. 4(*a*) and FIG. 4(*b*), the center position is shifted to the center (10, S10) in the lower left-hand direction when compared to that in FIG. 3(*a*) and FIG. 3(*b*), and gains of the contour correction become larger toward the periphery from the center in a concentric manner. FIG. 4(*a*) and FIG. 4(*b*) show a diagram showing a peripheral light amount correction function which has converted from the basic peripheral light amount correction function. FIG. 4(*a*) shows positions on a screen in a plane. FIG. 4(*b*) shows the positions on the screen in the X-Y plane and light amount levels to be corrected in the Z-axis.

As described above, owing to the conversion of image data D from the image capturing element 10 using the correction function addressing the non-uniformity of the peripheral light amount, an image appearing to have uniform luminance values in an entire image capturing screen is obtained.

Corrected image data N output from the luminance value correction computing circuit 40 is supplied to the selector 32 in the coordinate conversion circuit 30. Either corrected image data N or image data D from the image capturing element 10 is selected at the selector 32 and supplied to the integrating/averaging circuit 33. With the use of corrected image data N, it is possible to check whether or not the correction has been appropriately performed.

Next, a method for checking whether or not the correction has been appropriately performed by using corrected image data N will be described.

First, an actual correction is performed on image data D supplied from the image capturing element 10 by using coefficient values CoeffX and CoeffY which have the same image capturing condition as image data D to be corrected and which are previously obtained and stored in the register group 35. For corrected image data N, the integrating/averaging circuit 33 obtains integrated/averaged values of luminance values for four areas shown in FIG. 2, and coefficient value CoeffX and coefficient value CoeffY are calculated as correction checking coefficient value P by the coefficient generation circuit 34.

The calculated coefficient values CoeffX and CoeffY of correction checking coefficient value P are output from the coordinate conversion circuit 30 to the outside. When the correction checking coefficient value P is:

CoeffX=CoeffY="0", then it is determined by a determination circuit (not shown) that the correction has been appropriately performed. However, in practice, it is considered to be extremely difficult to obtain:

CoeffX=CoeffY="0"

Thus, depending on whether or not correction checking coefficients CoeffX and CoeffY are both less than or equal to a predetermined range, it is possible to determined whether or not the correction has been appropriately performed.

Further, when it is determined that the corrected image has not been appropriately corrected, it is possible to appropriately perform a correction by performing a fine adjustment using correction degree adjusting coefficient CoeffZ.

As described above, according to the present invention, the peripheral light amount correction circuit 1 is structured by the image synchronization signal generation circuit 20, the coordinate conversion circuit 30 and the luminance value correction computing circuit 40. An integrated value of luminance values is calculated at the coordinate conversion circuit 30 to extract light amount information from an input image, and coordinate values to be input to the luminance value correction computing circuit 40 are generated based on an integrated/averaged value of the light amount information. In the luminance value correction computing circuit 40, peripheral light amount correction functions are converted based on the input coordinate values from the coordinate conversion circuit 30 to perform an appropriate correction on the input image. In this manner, it is possible to correct insufficient light amount at a periphery due to lens shading and also possible to correct the non-uniformity of light amount at the periphery due to a distortion resulting from a precision of the lens itself or a poor mounting precision of the lens.

Figure 5:
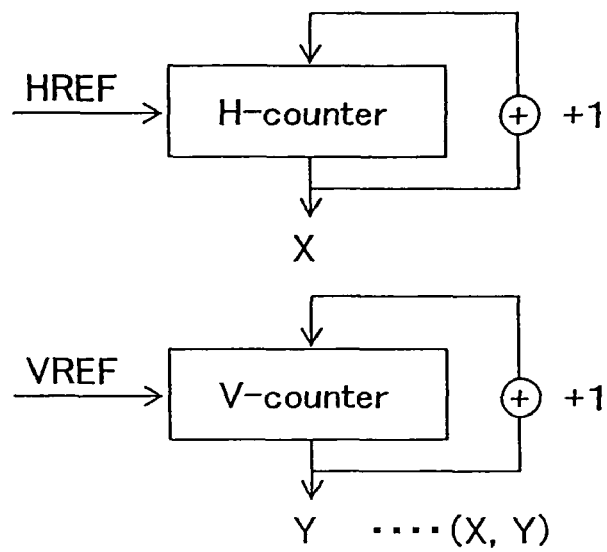
FIG. 5 is a diagram showing an example of a hardware structure of the image coordinate generation circuit in FIG. 1.

A specific description has not been given in the present embodiment. However, the coordinate conversion circuit 30 can be structured by either hardware or software. FIG. 5 shows an example of a hardware structure of the image coordinate generation circuit 31 in FIG. 1. Horizontal synchronization signal HREF and vertical synchronization signal VREF from the image synchronization signal generation circuit 20 are counted by H-counter (horizontal counter) and V-counter (vertical counter) using the uppermost left-hand corner in an input image as the origin [coordinates (0, 0)], input horizontal pixel coordinates HPixNum and input vertical pixel coordinates VPixNum are numbered and the values of (X, Y) are output as input image coordinate value signal E to the integrating/averaging circuit 33.

Figure 6:
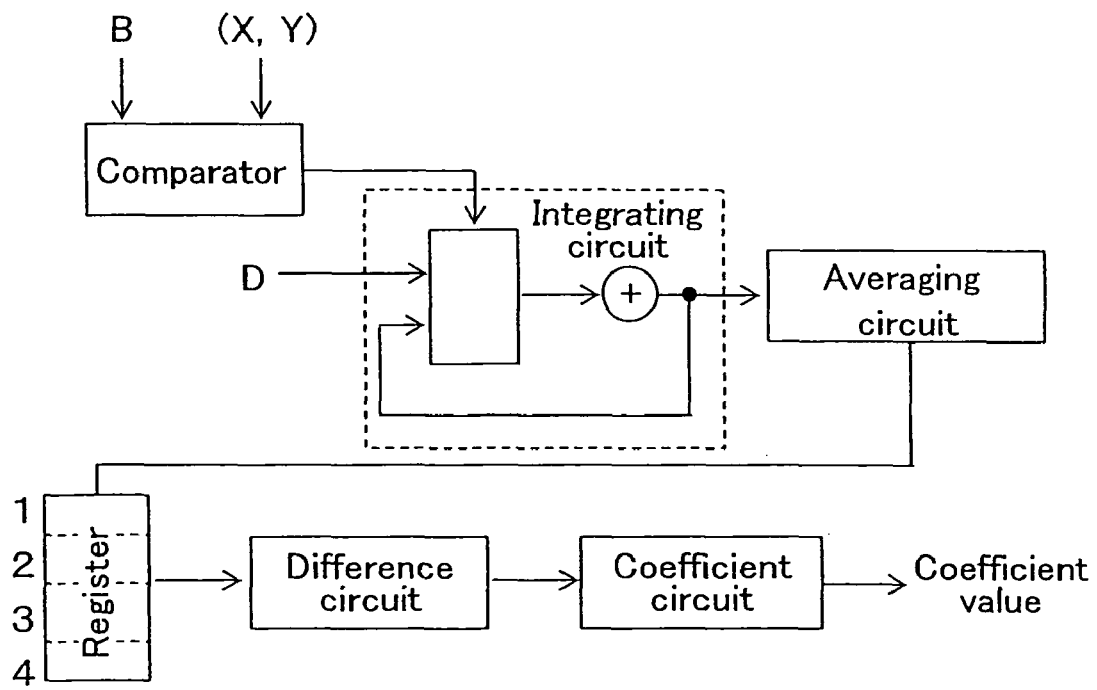
FIG. 6 is a diagram showing an example of a hardware structure of the integrating/averaging circuit and the coefficient generation circuit in FIG. 1.

FIG. 6 shows an example of a hardware structure of the integrating/averaging circuit 33 and the coefficient generation circuit 34 in FIG. 1. Area designating synchronization signals B (area designating horizontal synchronization signals HArea1, HArea2, HArea3, HArea4 and area designating vertical synchronization signals VArea1, VArea2, VArea3, VArea4) input from the image synchronization signal generation circuit 20 are used for comparison at a comparator between coordinate values of the previously-designated four areas with coordinate values (X, Y) from the image coordinate generation circuit 31. When the values both match each other, luminance values of image data D for each of the four areas are integrated at an integrating circuit. The luminance integrated value of each of the four areas is divided by the number of pixels of the area by an averaging circuit to obtain an average value of each of the four areas. The average values of the four areas are temporarily stored in a register one by one. In each of the four areas, as described above, the distance from the center of the gravity of each area to (X center, Y center) is set to have equal distance H. Further, the average values of the four areas temporarily stored in the register are used as inputs to obtain difference values of area (1) average value–area (4) average value and area (3) average value–area (2) average value by a difference circuit. The difference values are divided by a distance between the respective areas using a (1/distance) circuit (coefficient circuit) to obtain coefficient values (difference coefficient values) CoeffX and CoeffY.

Next, a description will be given regarding an example of a software structure of the coordinate conversion circuit 30 and the luminance value correction computing circuit 40 in FIG. 1. In the coordinate conversion circuit 30 and the luminance value correction computing circuit 40 in FIG. 1, a CPU (Central Processing Unit) as a control section reads a control program in a ROM as storage means (readable recording medium) (e.g., optical disk, hard disk and IC memory) into a RAM as a work memory. Based on the control program in the RAM, the coordinate conversion circuit 30 and the luminance value correction computing circuit 40 perform each function of: coordinate generation means for numbering input horizontal pixel coordinates and input vertical pixel coordinates one by one using the uppermost left-hand corner on the screen in each pixel data from the image capturing element 10 as original coordinates (0, 0), and obtaining coordinate (X, Y) values on the screen; difference coefficient value obtaining means for obtaining a difference coefficient value of integrated/averaged values for areas by using the coordinate (X, Y) values for each pixel data from the image capturing element 10, wherein each area is point-symmetrical with respect to the center of the image capturing area; pixel coordinate conversion means for performing a conversion into new pixel coordinate values in the image capturing area, based on the difference coefficient value; peripheral light amount correction function conversion means for converting a basic peripheral light amount correction function into a new peripheral light amount correction function based on the new pixel coordinate values; peripheral light amount correction means for performing a peripheral light amount correction on each pixel data from the image capturing element based on the new peripheral light amount correction function; and, when the difference coefficient value is computed for each pixel after a peripheral light amount correction has been performed on each pixel data from the image capturing element 10, correction check means capable of checking whether or not the peripheral light amount correction has been appropriately performed depending on whether or not the computed difference coefficient value is within a predetermined reference range.

Figure 7:
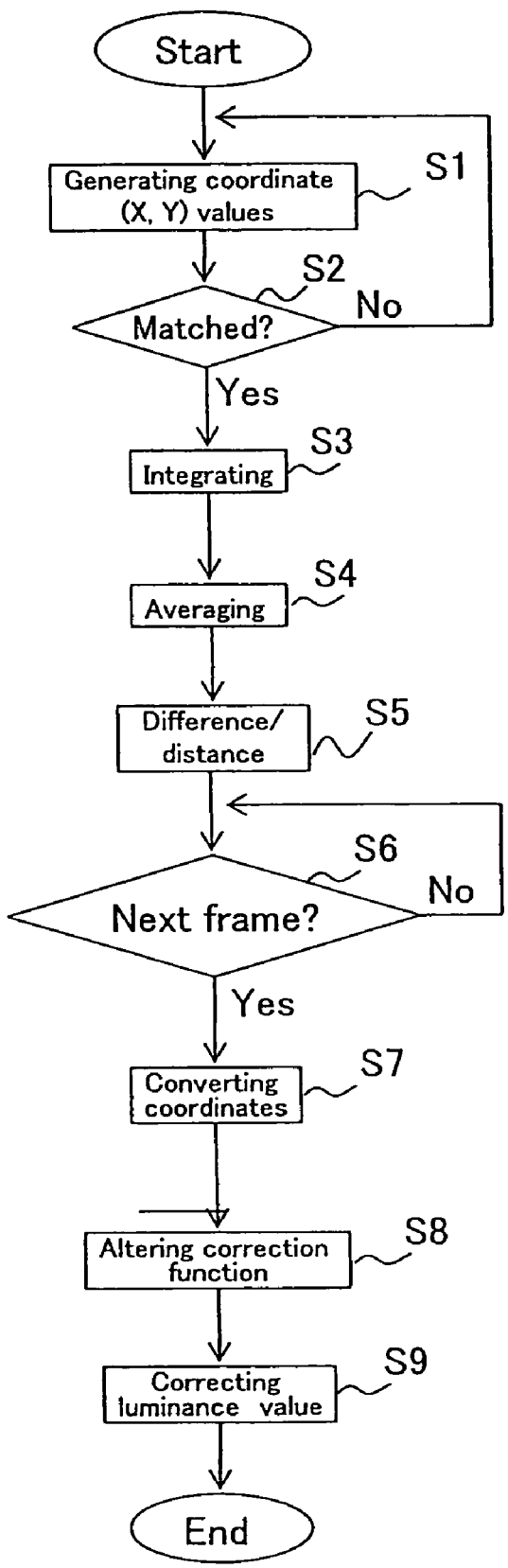
FIG. 7 is a flowchart showing an example of an operation of the coordinate conversion circuit and the luminance value correction computing circuit in FIG. 1.
Figure 8:
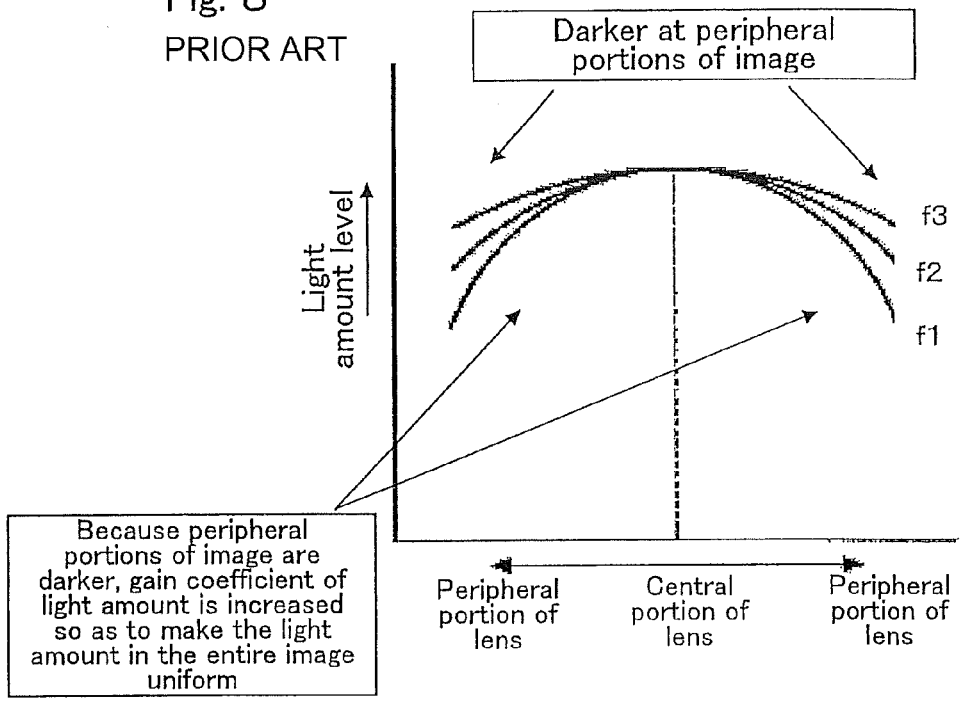
FIG. 8 is a graph showing a relationship between a lens position with respect to a plurality of light receiving sections of a conventional image capturing element and a light amount level.
Figure 9:
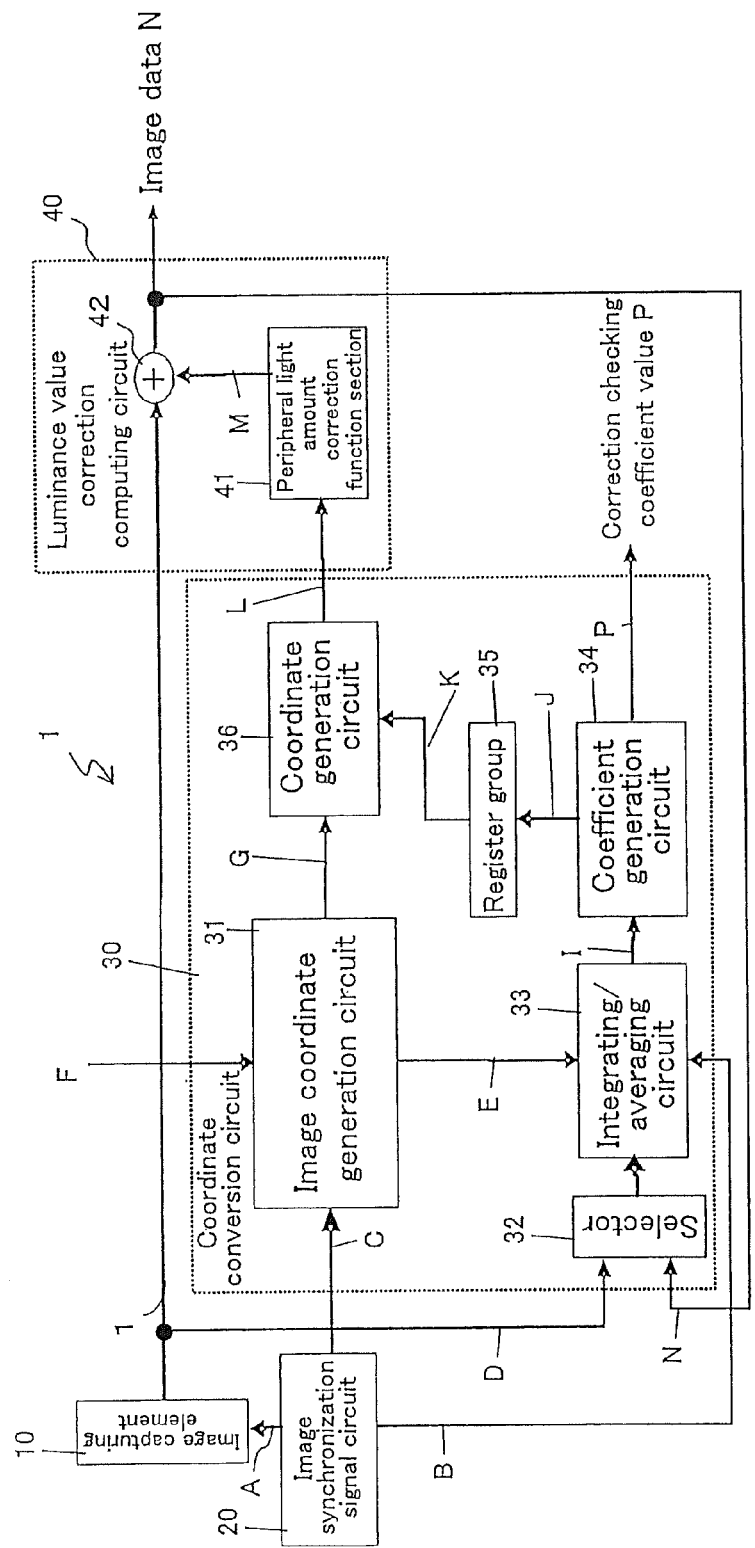
FIG. 9 is a block diagram showing an exemplary structure of a conventional shading correction circuit disclosed in Reference 5.
Figure 10:
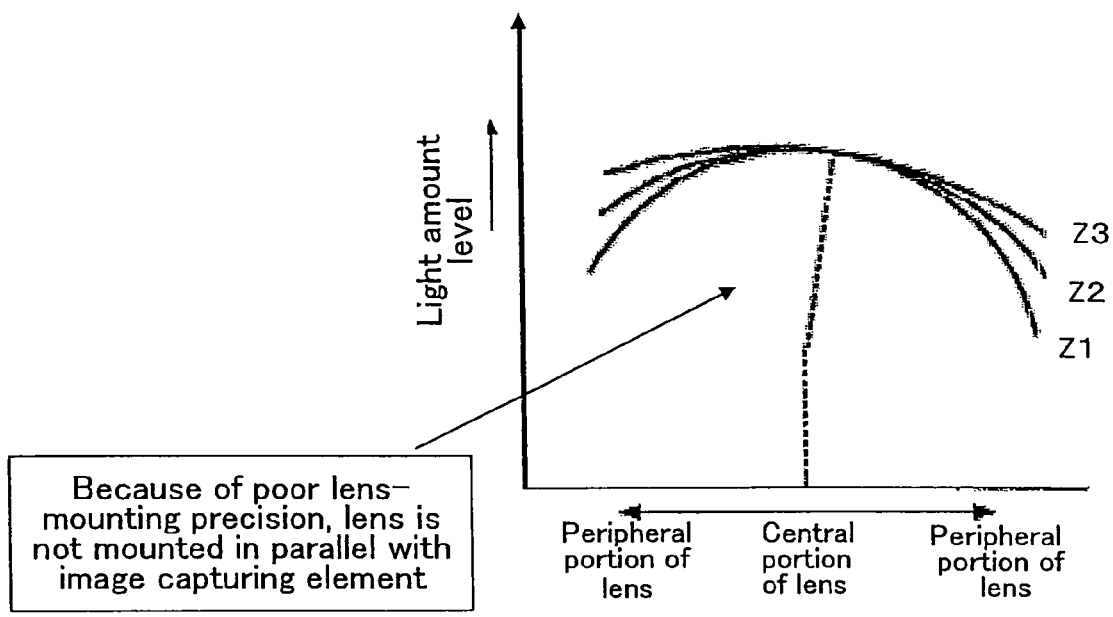
FIG. 10 is a graph showing a relationship between a lens position with respect to a plurality of light receiving sections of a conventional image capturing element and a light amount level, when there is a problem regarding a mounting precision of a lens.
Figure 11:
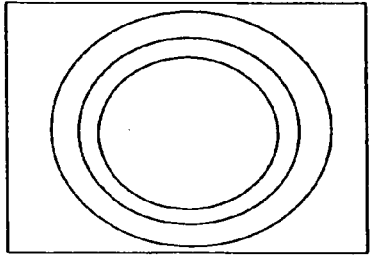
FIG. 11(a) and FIG. 11(b) are a diagram for describing a problem of a conventional light amount correction method.
Figure 11:
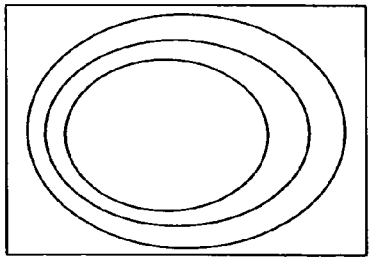

FIG. 7 shows a flowchart showing an operation of the coordinate conversion circuit 30 and the luminance value correction computing circuit 40 in FIG. 1.

First, as shown in FIG. 7, in step S1, using the uppermost left-hand corner in an input image as the origin [coordinates (0, 0)], input horizontal pixel coordinates HPixNum and input vertical pixel coordinates VpixNum are numbered to obtain values of (X, Y).

Thereafter, in step S2, coordinate values of previously-designated four areas and the coordinate values (X, Y) obtained in step S1 are compared to determine if both match each other. When both match each other (YES) in step S2, luminance values of image data D are integrated for each of the four areas in step S3.

Further, in step S4, the luminance integrated value of each of the four areas is divided by the number of the pixels of the area to obtain an average value of each of the four areas.

Next, in step S5, as differences of the average values of the four areas, area (1) average value–area (4) average value and area (3) average value–area (2) average value are obtained. Further, the difference values are divided by a distance between the respective areas to obtain coefficient values CoeffX and CoeffY.

In this state, in step S6, it is determined if the present frame is completed and the next frame has been started.

When it is determined that the next frame has been started (YES) in step S6, coefficient values CoeffX and CoeffY obtained in step S5 are used to perform a coordinate conversion process prior to changing to the coordinate values of the next frame in step S7.

In step S8, a conversion is performed on a correction function by using the new coordinate values on which the coordinate conversion process has been performed. Further, in step S9, a peripheral light amount correction is performed on luminance values of the image data from the image capturing element 10 by the converted correction function.

This light amount correction is performed at the time of product shipment and the like. Later, the obtained coefficient values CoeffX and CoeffY are stored in storage means so as to always perform steps S7 through S9 using them.

The present embodiment has described a case in which luminance values are used as pixel data values to perform a peripheral light amount correction. However, it is possible to perform a peripheral light amount correction by using pixel data values of such as R, G and B which include luminance components. A peripheral light amount correction can be performed by using, for example, G color data.

In addition, a specific description has not been given in the embodiment described above. However, as long as the peripheral light amount correction circuit 1 according to the present embodiment includes: the integrating/averaging circuit 33 and the coefficient generation circuit 34 as difference coefficient value obtaining means for obtaining a difference coefficient value of integrated/averaged values for areas for each pixel data from the image capturing element 10, wherein each area is point-symmetrical with respect to the center of the image capturing area; the coordinate generation circuit 36 as pixel coordinate conversion means for performing a conversion into new pixel coordinate values in the image capturing area based on the difference coefficient value; the peripheral light amount correction function section 41 as peripheral light amount correction function conversion means for converting a basic peripheral light amount correction function into a new peripheral light amount correction function based on the new pixel coordinate values; and the adder 42 as peripheral light amount correction means for performing a peripheral light amount correction on each pixel data from the image capturing element 10 based on the new peripheral light amount correction function, the objective of the present invention can be achieved, which is capable of correcting the insufficient peripheral light amount due to the lens shading as well as correcting the non-uniformity of light amount at the periphery due to a distortion resulting from a precision of the lens itself or a poor mounting precision of the lens.

In summary, the peripheral light amount correction circuit 1 according to the present embodiment can be structured by the integrating/averaging circuit 33 and a coefficient generation circuit 34 as difference coefficient value obtaining means for obtaining a difference coefficient value of integrated/averaged values for areas for each pixel data from the image capturing element 10, wherein each area is point-symmetrical with respect to the center of the image capturing area; the coordinate generation circuit 36 and the peripheral light amount correction function section 41 as peripheral light amount correction function conversion means for converting a basic peripheral light amount correction function into a new peripheral light amount correction function based on the difference coefficient value; and the adder 42 as peripheral light amount correction means for performing a peripheral light amount correction on each pixel data from the image capturing element 10 based on the new peripheral light amount correction function. In the embodiment described above, the peripheral light amount correction function conversion means is structured by the peripheral light amount correction function section 41. However, the present invention is not limited to this. The peripheral light amount correction function conversion means can be structured by the coordinate generation circuit 36 and the peripheral light amount correction function section 41. In this manner, similar to the description above, the objective of the present invention can be achieved, which is capable of correcting the insufficient peripheral light amount due to the lens shading as well as correcting the non-uniformity of light amount at the periphery due to a distortion resulting from a precision of the lens itself or a poor mounting precision of the lens.

The embodiment described above performs the peripheral light amount correction by correcting displacement of the pixel coordinate values by the coordinate generation circuit 36 based on the difference coefficient values from the coefficient generation circuit 34 and by correcting the correcting peripheral light amount correction function based on the corrected pixel coordinate values.

In addition, a specific description has not been given in the embodiment described above. Herein, a description will be given regarding an electronic information device including an image input device, (such as a digital camera (e.g., digital video camera and digital still camera), an image input camera, a scanner, a facsimile and a camera-equipped cell phone device), using a solid-state image capturing device, including the peripheral light amount correction circuit 1 in the embodiment described above, for an image capturing section. The electronic information device according to the present invention includes at least one of: a memory section (e.g., recording media) for data-recording a high-quality image data obtained by using the solid-state image capturing device according to the embodiment described above according to the present invention for the image capturing section after a predetermined signal process is performed on the image dada for recording; display means (e.g., liquid crystal display device) for displaying this image data on a display screen (e.g., liquid crystal display screen) after a predetermined signal process is performed on the image data for display; communication means (e.g., transmitting and receiving device) for communicating this image data after a predetermined signal process is performed on the image data for communication; and image output means for printing (typing out) and outputting (printing out) this image data.

As described above, the present invention is exemplified by the use of its preferred embodiment(s). However, the present invention should not be interpreted solely based on the present embodiment(s). It is understood that the scope of the present invention should be interpreted solely based on the claims. It is also understood that those skilled in the art can implement equivalent scope of technology, based on the description of the present invention and common knowledge from the description of the detailed preferred embodiment(s) of the present invention. Furthermore, it is understood that any patent, any patent application and any references cited in the present specification should be incorporated by reference in the present specification in the same manner as the contents are specifically described therein.

INDUSTRIAL APPLICABILITY

In the field of: a peripheral light amount correction apparatus for correcting a light amount at a periphery of an image capturing screen having a subject image captured thereon through an image capturing lens; a peripheral light amount correction method using the peripheral light amount correction method; an electronic information device, such as a digital camera (e.g., digital video camera and digital still camera), an image input camera, a scanner, a facsimile and a camera-equipped cell phone device having a digital camera module mounted thereon, using a solid-state image capturing device, including the peripheral light amount correction apparatus, for an image capturing section; a control program for causing a computer to execute the peripheral light amount correction method; and a computer-readable recording medium having the control program recorded thereon, it is possible, at a low cost with precision, to correct insufficient light amount at a periphery due to lens shading and also possible to correct the non-uniformity of light amount at the periphery due to a distortion resulting from a precision of the lens itself or a poor mounting precision (positional displacement or tilt) of the lens, which cannot be corrected with conventional techniques. Therefore, it is possible to improve the yield of the whole digital camera product (e.g., camera module), which is conventionally treated as defective product. Further, since it is possible to check whether or not a correction has been appropriately performed on a corrected image, there is no need for newly introducing an inspection apparatus.

The invention claimed is:

1. A peripheral light amount correction apparatus for correcting a peripheral light amount at an image capturing area for capturing a subject image by an image capturing element through a light collecting lens, the peripheral light amount correction apparatus comprising:
    difference coefficient value obtaining means for obtaining a difference coefficient value of an integrated/averaged value of each area for each pixel data from the image capturing element, each area being point-symmetrical with respect to the center of the image capturing area;
    peripheral light amount correction function conversion means for converting a basic peripheral light amount correction function into a new peripheral light amount correction function based on the difference coefficient value; and
    peripheral light amount correction means for performing a peripheral light amount correction on each pixel data from the image capturing element based on the new peripheral light amount correction function.

2. A peripheral light amount correction apparatus according to claim 1, wherein the integrated/averaged value is obtained by dividing an integrated value of each area by the number of pixels of the respective area.

3. A peripheral light amount correction apparatus according to claim 1, wherein the difference coefficient value obtaining means computes a value obtained by dividing the difference value of the integrated/averaged value of each area by a distance between respective areas as the difference coefficient value.

4. A peripheral light amount correction apparatus according to claim 1, wherein the difference coefficient value obtaining means computes the difference coefficient value for each pixel data from the image capturing element, an image for each pixel data being captured such that a light amount of the image is uniform in the entire screen.

5. A peripheral light amount correction apparatus according to claim 1, wherein the difference coefficient value obtaining means computes the difference coefficient value for each pixel data from the image capturing element, an image for each pixel data being captured such that a light amount of the image is graded in a concentric manner.

6. A peripheral light amount correction apparatus according to claim 1, when the difference coefficient value is computed for each pixel after a peripheral light amount correction has been performed on each pixel data from the image capturing element, further comprising, as the difference coefficient value obtaining means, correction check means capable of checking whether or not the peripheral light amount correction has been appropriately performed depending on whether or not the computed difference coefficient value is within a predetermined reference range.

7. A peripheral light amount correction apparatus according to claim 1, wherein the peripheral light amount correction function conversion means uses, as the basic peripheral light amount correction function, at least one peripheral light amount correction function for altering gain values of a contour correction in a concentric manner using the center of the screen as the origin.

8. A peripheral light amount correction apparatus according to claim 1, wherein the peripheral light amount correction means performs a peripheral light amount correction on a luminance value or an RGB data value of each image data from the image capturing element.

9. A peripheral light amount correction apparatus according to claim 1, further comprising synchronization signal generation means for generating an image capturing element operating synchronization signal for controlling a driving timing of the image capturing element and an area designating synchronization signal for performing a coordinate computation on each pixel data from the image capturing element.

10. A peripheral light amount correction apparatus according to claim 1, wherein when one of an auto focus, an optical zoom and a macro function is included as a lens function of the collecting lens, the difference coefficient value obtaining means obtains the difference coefficient value corresponding to a moved position of the light collecting lens and stores it in storage means.

11. An electronic information device using a solid-state image capturing device including a peripheral light amount correction apparatus according to claim 1 for an image capturing section.

12. A peripheral light amount correction apparatus according to claim 1, wherein the areas are at least one of: two areas, the distance of which from the center of a screen of the image capturing area to the center of the gravity of each area in one direction is equal to each other; and two areas, the distance of which is equal to each other in a direction crossing the one direction.

13. A peripheral light amount correction apparatus according to claim 12, wherein the one direction and the direction crossing the one direction are an up-and-down direction and a left-and-right direction orthogonal to each other in the screen of the image capturing area.

14. A peripheral light amount correction apparatus according to claim 1, wherein the difference coefficient value obtaining means computes the difference coefficient value integrated/averaged value for a luminance value or an RGB data value of each pixel data.

15. A peripheral light amount correction apparatus according to claim 14, wherein the integrated/averaged value is obtained by dividing an integrated value of each area by the number of pixels of the respective area.

16. A peripheral light amount correction apparatus according to claim 14, wherein the difference coefficient value obtaining means computes a value obtained by dividing the difference value of the integrated/averaged value of each area by a distance between respective areas as the difference coefficient value.

17. A peripheral light amount correction apparatus according to claim 1, wherein the difference coefficient value obtaining means includes:
an integrating/averaging circuit for computing the integrated/averaged value of each area for each pixel data from the image capturing element; and
a coefficient generation circuit for obtaining an X difference coefficient value for performing a conversion on an X coordinate and a Y difference coefficient value for performing a conversion on a Y coordinate using the integrated/averaged value from the integrating/averaging circuit.

18. A peripheral light amount correction apparatus according to claim 17, wherein the integrating/averaging circuit includes:
a comparing circuit for comparing the coordinate values of each area with the coordinate (X, Y) values;
an integrating circuit for integrating, when a result compared by the comparing circuit is matched, a luminance value of each pixel data of the matched coordinate (X, 1) values for each area; and
an averaging circuit for computing the integrated/averaged value by dividing the integrated value of each area by the number of pixels of the respective area.

19. A peripheral light amount correction apparatus according to claim 17, wherein the coefficient generation circuit includes:
a difference circuit for computing a difference value of the integrated/averaged value of each area; and
a coefficient circuit for computing a value obtained by dividing the difference value by a distance between the respective areas as the difference coefficient value.

20. A peripheral light amount correction apparatus according to claim 1, wherein the peripheral light amount correction function conversion means includes:
pixel coordinate conversion means for performing a conversion into new pixel coordinate values of the image capturing area based on the difference coefficient value; and
peripheral light amount correction function section for converting the basic peripheral light amount correction function into the new peripheral light amount correction function based on the new pixel coordinate values.

21. A peripheral light amount correction apparatus according to claim 20, wherein the pixel coordinate conversion means fine-adjusts the new pixel coordinate values using an adjustment coefficient for adjusting a correction degree.

22. A peripheral light amount correction apparatus according to claim 20, wherein when frames are changed, the pixel coordinate conversion means detects this and performs a coordinate conversion process using the difference coefficient value prior to changing to coordinate values of the next frame to be changed.

23. A peripheral light amount correction apparatus according to claim 20, further comprising coordinate generation means for numbering input horizontal pixel coordinates and input vertical pixel coordinates one by one using the uppermost left-hand corner on the screen in each pixel data from the image capturing element as original coordinates (0, 0) and obtaining coordinate (X, Y) values on the screen, and the difference coefficient value obtaining means performs an integration process on each area using the coordinate (X, Y) values.

24. A peripheral light amount correction apparatus according to claim 23, wherein the difference coefficient value obtaining means further includes means for comparing coordinate values of each area and the coordinate (X, Y) values and determining whether or not both match each other, and the difference coefficient value obtaining means computes the integrated/averaged value for each pixel data for the coordinate (X, Y) values when both match each other and computes the difference coefficient value using the integrated/averaged value.

25. A peripheral light amount correction apparatus according to claim 23, wherein the pixel coordinate conversion means converts the coordinate (X, Y) values into the new pixel coordinate values based on the difference coefficient value.

26. A peripheral light amount correction apparatus according to claim 23, wherein the synchronization signal generation means outputs a horizontal synchronization signal and a vertical synchronization signal to the coordinate generation means, and
the coordinate generation means includes a horizontal counter for counting the horizontal synchronization signal and a vertical counter for counting the vertical synchronization signal and outputs the coordinate (X, Y) values based on the horizontal counter and the vertical counter.

27. A peripheral light amount correction method for correcting a peripheral light amount at an image capturing area for capturing a subject image by an image capturing element through a light collecting lens, the peripheral light amount correction method comprising:
difference coefficient value obtaining step of obtaining a difference coefficient value of an integrated/averaged value of each area for each pixel data from the image capturing element, each area being point-symmetrical with respect to the center of the image capturing area;
peripheral light amount correction function conversion step of converting a basic peripheral light amount correction function into a new peripheral light amount correction function based on the difference coefficient value; and
peripheral light amount correction step of performing a peripheral light amount correction on each pixel data from the image capturing element based on the new peripheral light amount correction function.

28. A peripheral light amount correction method according to claim 27, wherein the integrated/averaged value is obtained by dividing an integrated value of each area by the number of pixels of the respective area.

29. A peripheral light amount correction method according to claim 27, wherein the difference coefficient value obtaining step computes a value obtained by dividing the difference value of the integrated/averaged value of each area by a distance between respective areas as the difference coefficient value.

30. A peripheral light amount correction method according to claim 27, wherein the difference coefficient value obtaining step computes the difference coefficient value for each pixel data from the image capturing element, an image for each pixel data being captured such that a light amount of the image is uniform in the entire screen.

31. A peripheral light amount correction method according to claim 27, wherein the difference coefficient value obtaining step computes the difference coefficient value for each pixel data from the image capturing element, an image for each pixel data being captured such that a light amount of the image is graded in a concentric manner.

32. A peripheral light amount correction method according to claim 27, when the difference coefficient value is computed for each pixel after a peripheral light amount correction has been performed on each pixel data from the image capturing element, further comprising, as the difference coefficient value obtaining step, correction check step capable of checking whether or not the peripheral light amount correction has been appropriately performed depending on whether or not the computed difference coefficient value is within a predetermined reference range.

33. A peripheral light amount correction method according to claim 27, wherein the peripheral light amount correction function conversion step uses, as the basic peripheral light amount correction function, at least one peripheral light amount correction function for altering gain values of a contour correction in a concentric manner using the center of the screen as the origin.

34. A peripheral light amount correction method according to claim 27, wherein the peripheral light amount correction step performs a peripheral light amount correction on a luminance value or an RGB data value of each image data from the image capturing element.

35. A non-transitory computer-readable recording medium having a control program for causing a computer to execute each step of a peripheral light amount correction method according to claim 27, recorded thereupon.

36. A peripheral light amount correction method according to claim 27, wherein the areas in the difference coefficient value obtaining step are at least one of: two areas, the distance of which from the center of a screen of the image capturing area to the center of the gravity of each area in one direction is equal to each other; and two areas, the distance of which is equal to each other in a direction crossing the one direction.

37. A peripheral light amount correction method according to claim 36, wherein the one direction and the direction crossing the one direction are an up-and-down direction and a left-and-right direction orthogonal to each other in the screen of the image capturing area.

38. A peripheral light amount correction method according to claim 27, wherein the difference coefficient value obtaining step computes the difference coefficient value of the integrated/averaged value for a luminance value or an RGB data value of each pixel data.

39. A peripheral light amount correction method according to claim 38, wherein the integrated/averaged value is obtained by dividing an integrated value of each area by the number of pixels of the respective area.

40. A peripheral light amount correction method according to claim 38, wherein the difference coefficient value obtaining step computes a value obtained by dividing the difference value of the integrated/averaged value of each area by a distance between respective areas as the difference coefficient value.

41. A peripheral light amount correction method according to claim 27, wherein the peripheral light amount correction function conversion step includes:
pixel coordinate conversion step of performing a conversion into new pixel coordinate values of the image capturing area based on the difference coefficient value; and
a step of converting the basic peripheral light amount correction function into the new peripheral light amount correction function based on the new pixel coordinate values.

42. A peripheral light amount correction method according to claim 41, wherein when frames are changed, the pixel coordinate conversion step detects this and performs a coordinate conversion process using the difference coefficient value prior to changing to coordinate values of the next frame to be changed.

43. A peripheral light amount correction method according to claim 41, further comprising coordinate generation step of numbering input horizontal pixel coordinates and input vertical pixel coordinates one by one using the uppermost left-hand corner on the screen in each pixel data from the image capturing element as original coordinates (0, 0) and obtaining coordinate (X, Y) values on the screen prior to the difference coefficient value obtaining step, and performing an integration process on each area using the coordinate (X, Y) values in the difference coefficient value obtaining step.

44. A peripheral light amount correction method according to claim 43, wherein the difference coefficient value obtaining step further includes a step of comparing coordinate values of each area and the coordinate (X, Y) values and determining whether or not both match each other, and the difference coefficient value obtaining step computes the integrated/averaged value for each pixel data for the coordinate (X, Y) values when both match each other and computes the difference coefficient value using the integrated/averaged value.

45. A peripheral light amount correction method according to claim 43, wherein the pixel coordinate conversion step converts the coordinate (X, Y) values into the new pixel coordinate values based on the difference coefficient value.

\* \* \* \* \*